United States Patent
Cousins (10) Patent No.: US 7,200,656 B1
(45) Date of Patent: Apr. 3, 2007

(54) METHODS AND SYSTEMS FOR SIMULTANEOUSLY DETECTING SHORT AND LONG TERM PERIODICITY FOR TRAFFIC FLOW IDENTIFICATION

(75) Inventor: David Bruce Cousins, Barrington, RI (US)

(73) Assignee: BBN Technologies Corp., Cambridge, MA (US)

( * ) Notice: Subject to any disclaimer, the term of this patent is extended or adjusted under 35 U.S.C. 154(b) by 1047 days.

(21) Appl. No.: 10/245,089

(22) Filed: Sep. 17, 2002

Related U.S. Application Data (63) Continuation-in-part of application No. 10/167,620, filed on Oct. 19, 2001.

(60) Provisional application No. 60/339,451, filed on Oct. 26, 2001, provisional application No. 60/340,721, filed on Oct. 30, 2001, provisional application No. 60/355,573, filed on Feb. 5, 2002.

(51) Int. Cl.
*G06F 15/173* (2006.01)

(52) U.S. Cl. .............. 709/224; 709/232; 370/230.1; 370/252; 714/39

(58) Field of Classification Search ............ 709/223, 709/224, 232; 714/39; 370/230.1, 252
See application file for complete search history.

(56) References Cited

U.S. PATENT DOCUMENTS

| | | | |
|---|---|---|---|
| 5,793,762 A | 8/1998 | Penners et al. | |
| 5,838,919 A | 11/1998 | Schwaller et al. | |
| 5,859,979 A | 1/1999 | Tung et al. | |
| 5,881,237 A | 3/1999 | Schwaller et al. | |
| 5,999,563 A | 12/1999 | Polley et al. | |
| 6,021,158 A | 2/2000 | Schurr et al. | |
| 6,092,039 A * | 7/2000 | Zingher | 704/221 |
| 6,269,330 B1 * | 7/2001 | Cidon et al. | 714/43 |
| 6,434,624 B1 * | 8/2002 | Gai et al. | 709/232 |
| 6,449,255 B1 * | 9/2002 | Waclawsky | 370/236 |
| 6,484,203 B1 | 11/2002 | Porras et al. | |
| 6,519,703 B1 | 2/2003 | Joyce | |
| 6,546,017 B1 | 4/2003 | Khaunte | |
| 6,597,660 B1 * | 7/2003 | Rueda et al. | 370/230.1 |
| 6,597,661 B1 | 7/2003 | Bonn | |
| 6,665,317 B1 * | 12/2003 | Scott | 370/516 |
| 6,700,895 B1 | 3/2004 | Kroll | |
| 6,718,395 B1 | 4/2004 | Ziegler | |
| 6,721,355 B1 * | 4/2004 | McClennon et al. | 375/222 |

(Continued)

OTHER PUBLICATIONS

Abry et al., "Multiscale Nature of Network Traffic," IEEE Signal Processing Magazine, pp. 28-46, (2002).

(Continued)

*Primary Examiner*—Saleh Najjar
*Assistant Examiner*—Oanh Duong
(74) *Attorney, Agent, or Firm*—Fish & Neave IP Group Ropes & Gray LLP (57) ABSTRACT

A method of processing a communication signal may include computing a number of periodograms from the signal. Each of the periodograms may be generated from a portion of the signal. The number of periodograms may be combined in time sequence to form a spectrogram [510] containing the periodograms. A cepstrogram [520–540] may be generated by performing cepstrum processing on the spectrogram. The cepstrogram may be used to classify [330] the type of communication that produced the signal.

19 Claims, 9 Drawing Sheets

U.S. PATENT DOCUMENTS

| | | | |
|---|---|---|---|
| 6,741,556 B1* | 5/2004 | Seddigh et al. | 370/229 |
| 6,760,701 B2* | 7/2004 | Sharma et al. | 704/249 |
| 6,958,977 B1 | 10/2005 | Mitrani et al. | |
| 6,981,158 B1 | 12/2005 | Sanchez | |
| 7,065,482 B2* | 6/2006 | Shorey et al. | 709/224 |
| 2002/0032871 A1 | 3/2002 | Malan et al. | |
| 2002/0039371 A1* | 4/2002 | Hedayat et al. | 370/516 |
| 2002/0112060 A1 | 8/2002 | Kato | |
| 2002/0150102 A1 | 10/2002 | Janko et al. | |
| 2003/0008622 A1* | 1/2003 | Fernandez-Corbaton et al. | 455/68 |
| 2003/0097439 A1* | 5/2003 | Strayer et al. | 709/224 |

OTHER PUBLICATIONS

Boufaden et al., "Topic Segmentation: A First Stage to Dialog-Based Information Extraction," Department of Computer Science and Operations Research, University of Montreal, Quebec, Canada, 7 pages.

Cappe et al., "Long-Range Dependence and Heavy-Tail Modeling for Teletraffic Data," IEEE Signal Processing Magazine, pp. 14-27, (2002).

Guerin et al., "A Unified Approach to Bandwidth Allocation and Access Control in Fast Packet-Switched Networks," IEEE INFCOM, pp. 1-12, (1992).

Hazen et al., "Recent Improvements in an Approach to Segment-Based Automatic Language identification," Spoken Language Systems Group, Laboratory for Computer Science, Massachusetts Institute of Technology, Cambridge, MA, 4 pages.

Kay, S.M. "Modern Spectral Estimation: Theory & Application," Prentice Hall, (1988).

Oppenheim et al., "Discrete- Time Signal Processing," Prentice Hall, (1989).

Parekh, A.K., "A Generalized Processor Sharing Approach to Flow Control in Integrated Services Networks," MIT Ph.D. Thesis, (Feb. 1992).

Partridge, C., "Gigabit Networking," Addison-Wesley, (1994).

Ramus et al., "Language Identification with Suprasegmental Cues: A Study based on Speech Resynthesis," Journal of the Acoustical Society of America, 105(1):512-521, (1999).

Savage et al., "Practical Network Support for IP Traceback," Department of Computer Science and Engineering, University of Washington, Seattle, WA, 12 pages.

Schwartz et al., "Smart Packets: Applying Active Networks to Network Management," ACM Transaction on Computer Systems, 18(1):67-88, (2000).

Tagliaferri et al., "Hybrid Neural Networks for Frequency Estimation of Unevenly Sampled Data," IEEE, pp. 975-979, (1999).

Turner, Jonathan, "New Directions in Communications (or Which Way to the Information Age?)," IEEE Communications Magazine, 24(10):8-15, (Oct. 1986).

Co-pending U.S. Appl. No. 09/881,145, filed Jun. 14, 2001.

Co-pending U.S. Appl. No. 10/044,073, filed Jan. 11, 2002.

\* cited by examiner

METHODS AND SYSTEMS FOR SIMULTANEOUSLY DETECTING SHORT AND LONG TERM PERIODICITY FOR TRAFFIC FLOW IDENTIFICATION

RELATED APPLICATIONS

This application claims the benefit of priority under 35 U.S.C. § 119(e) of three provisional applications, Ser. Nos. 60/339,451, 60/340,721, and 60/355,573, filed Oct. 26, 2001, Oct. 30, 2001, and Feb. 5, 2002, respectively, the entire contents of which are incorporated herein by reference.

This application is also a continuation-in-part (CIP) under 37 C.F.R. § 1.53(b) of application Ser. No. 10/167,620, filed Oct. 19, 2001, the entire contents of which are incorporated herein by reference.

GOVERNMENT INTEREST

The invention described herein was made with government support. The U.S. Government may have certain rights in the invention, as provided by the terms of contract No. MDA972-01-C-0080 awarded by awarded by the Defense Advanced Research Projects Agency (DARPA).

BACKGROUND OF THE INVENTION

1. Field of the Invention

The present invention relates generally to communication networks, and more specifically, to the monitoring of data transmitted over such networks.

2. Description of Related Art

Communication networks typically include a number of interconnected communication devices. Connections among the devices in some communication networks are accomplished through physical wires or optical links. Such networks may be referred to as "wired" networks. Connections among the devices in other communication networks are accomplished through radio, infrared, or other wireless links. Such networks may be referred to as "wireless" networks.

Communication messages (e.g., data packets) sent across communication networks may be intercepted. Intercepted messages may yield valuable information, and the process of intercepting and analyzing messages may be referred to as "traffic analysis." In general, traffic analysis seeks to understand something about the message traffic by passively observing the traffic and analyzing that traffic offline to extract information. To guard against unwanted traffic analysis, messages are typically encrypted. For example, both the content and the destination of a message could be obscured through encryption.

In some situations, however, it may still be desirable to monitor traffic flow over communication networks. Accordingly, there is a need to monitor traffic flow even when identifying information associated with the messages is encrypted.

SUMMARY OF THE INVENTION

Methods and systems consistent with the present invention address this and other needs by examining periodicity information associated with arrival times of chunks of data in the traffic flow.

In accordance with one purpose of the invention as embodied and broadly described herein, a method of analyzing communication in a network may include obtaining time of arrival information for chunks of data in the network and constructing a signal to represent the time of arrival information. The signal may be processed to obtain periodicity information about both short-term periodicity and long-term periodicity of the signal.

In another implementation consistent with the present invention, a method of processing a communication signal may include computing a number of periodograms from the signal. Each of the periodograms may be generated from a portion of the signal. The number of periodograms may be combined in time sequence to form a spectrogram containing the periodograms. A cepstrogram may be generated by performing cepstrum processing on the spectrogram.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Data encryption may hide the contents of packets (i.e., discrete units of data), but it does not obscure basic protocol mechanisms and dynamics. Some examples of these basic mechanisms may include the packet's source, destination, and the interpacket gaps caused by certain applications.

Methods and systems consistent with the principles of the invention use short-term and long-term periodicity information in intercepted communication data to generate a signature associated with the data, even when the data is encrypted. Cepstrum processing may be used to generate the signature. This signature may be used to classify the type of communication that contained the data.

Exemplary Wired Network

Figure 1:
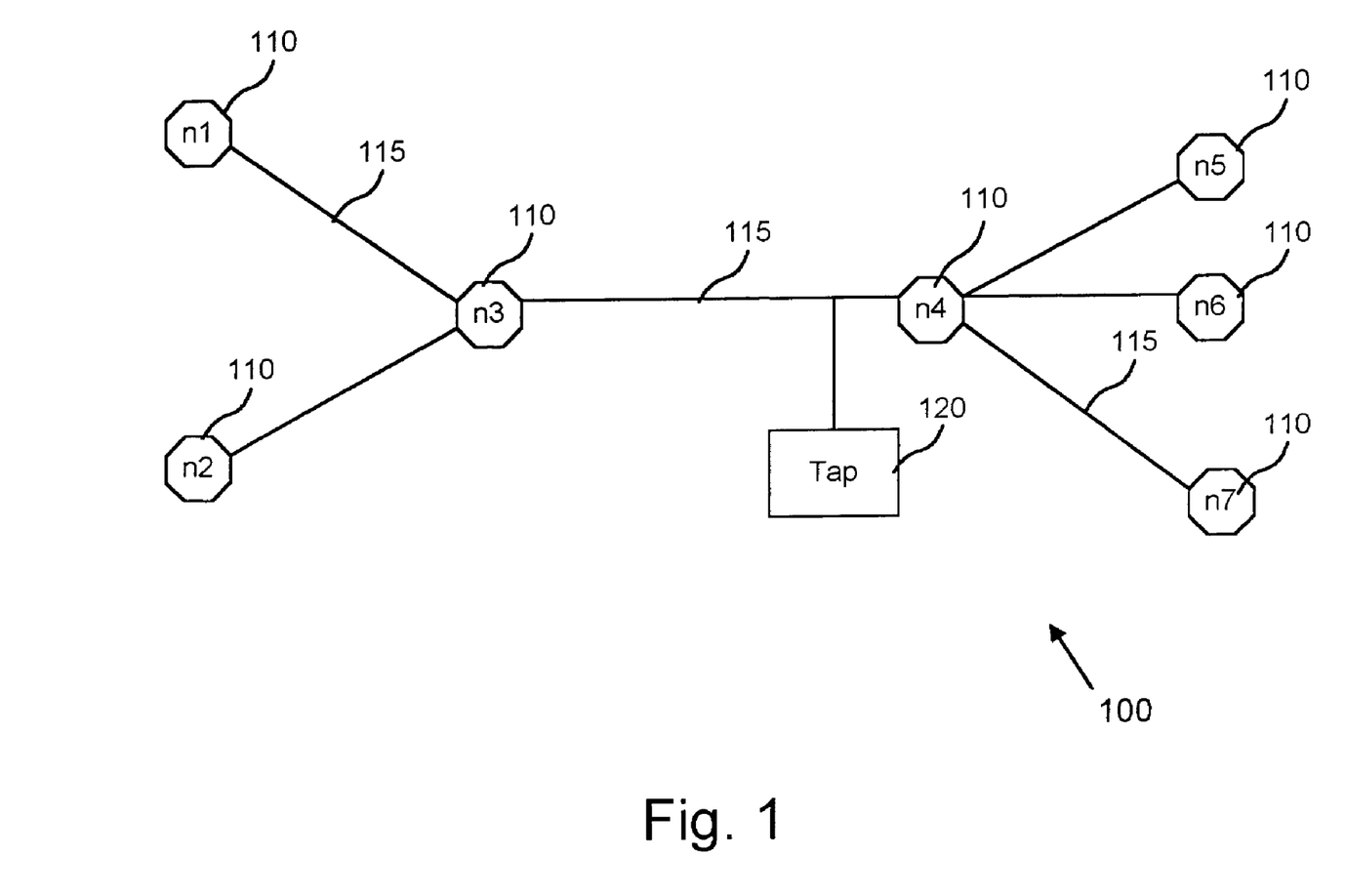
FIG. 1 is a diagram illustrating an exemplary wired network and tap according to an implementation consistent with the present invention.

FIG. 1 is a diagram illustrating an exemplary wired network 100 according to an implementation consistent with the present invention. The wired network 100 may include a number of network nodes 110 connected by a number of network links 115. The wired network 100 may also include one or more network taps 120. Although seven nodes 110 and one tap 120 are shown connected in a particular configuration, this is purely exemplary. Wired network 100 may include any number and configuration of nodes 110, links 115, and taps 120.

Network nodes 110 may be configured to send and receive information according to a communication protocol, such as TCP/IP. Although not specifically shown, some nodes 110 may be configured to provide a route for information to a specified destination. Other nodes 110 may be configured to send the information according to a previously-determined route. The network nodes 110 may communicate via discrete "chunks" of data that are transmitted by "senders" 110. A chunk may be individually detectable or distinguishable (i.e., a listening device, such as tap 120, may determine when a chunk starts and ends). A chunk of data need not exactly correspond to a packet of data. A chunk may represent part of a packet (e.g., a fragment or an ATM cell of an AAL5 PDU), or multiple packets (e.g., two packets concatenated).

Chunks of data may be transmitted by "senders" 110. A sender 110 may be the most recent node 110 to transmit a particular chunk (e.g., node n3 in FIG. 1, if the tap 120 intercepts a chunk transmitted to node n4). The sender 110 is not necessarily the node 110 that originated the chunk.

Network links 115 may include electronic links (e.g., wires or coaxial cables) and optical links (e.g., fiber optic cables). These links 115 may provide a connection between two nodes 110 (e.g., nodes n1 and n3). It may be possible to physically tap into these links 115 to observe the information carried on them.

Network tap 120 is a device that may intercept chunk transmissions on the network 100. The tap 120 may include a physical connection to a corresponding link 115 and circuitry to detect chunks of data on the link 115. The tap 120 may intercept chunks at a physical layer, a link layer, a network layer, or at higher layers of the network 100 being monitored. The layer at which interceptions occur is within the abilities of those skilled in the art, and may be chosen based on knowledge of, and access to, the network links 115. The tap 120 may include, for example, a transceiver for sensing the chunks of data and may also include other circuitry (e.g., clock circuitry) for determining times of arrival and duration of the chunks. The tap 120 may include a processor for computing any other information associated with the chunks, such as information (e.g., sending node and/or receiving node) contained within a header of the chunk of data.

Tap 120 may observe traffic on the link 115 between nodes n3 and n4. Tap 120 may record information about all the chunks that it observes in a "tracefile" (not shown). The tracefile may contain a minimum amount of information for each observed chunk. For example, the information may include the time the chunk was seen and the identity of the sender 110 of the chunk. The identity of the sender 110 may include, for example, the IP address of an IPsec gateway, the upstream or downstream transmitter on the point-to-point link 115, or "the same sender 110 as the one that also sent these other chunks." If available, the tracefile may also include additional information about the length or duration of the chunk, the destination node 110, or any insight into the contents of the chunk. Other information that may be available is the location of the tap 120 along the link 115 relative to the nodes 110 at either end of the link 115.

Tap 120 may not capture all traffic on the link 115. For example, tap 120 may occasionally make an error and mistakenly believe it has seen a chunk when no chunk was sent (e.g., due to bit errors on wired network 100). If transmissions are missed, false transmissions are detected, or if a sender 110 is misclassified, these events may be viewed as adding noise to the signals generated by the tap 120. Other sources of noise in the signal generated by the tap 120 may include interference from other signals (e.g., packets belonging to another flow, or jitter in timing due to sharing of a bottleneck among multiple flows).

Tap 120 may listen passively and may not participate in the monitored network 100 at the MAC (or higher) layers. In some cases, for example with 802.3 LANs, it is possible for the tap 120 to snoop at the MAC layer and extract some information about higher layer protocols. In the case of SONET networks, however, little or no information may be available about the MAC or higher layer protocols.

Although a single tap 120 is shown in FIG. 1, wired network 100 may contain many taps 120, which may be interconnected. Taps 120 may work independently using purely local information. Distributed algorithms may allow sharing of information among taps 120. In such a case, taps 120 may have a globally synchronized clock that allows information from multiple taps 120 to be combined. A clock resolution of the taps 120 may be finer than the data sampling resolution of the taps 120, so that information about transmissions (e.g., the start time, duration, inter-transmission gap, and even the presence of short transmissions) is not missed.

A tap 120 (or a network of taps 120) should store the transmissions that it detects for a sufficient amount of time. For example, the round-trip time of a transport layer flow cannot be determined if the history that may be stored at tap 120 is less than one roundtrip time. The total volume of data that must be stored depends on the capacity of the link 115 and the maximum round-trip time of flows seen on the link 115. Taps 120 may assign a unique identifier to each sender 110, for example, based on the address of the IPsec gateway. Taps 120 in the network 100 may assign the same unique identifier to any given sender 110.

Exemplary Wireless Network

Figure 2:
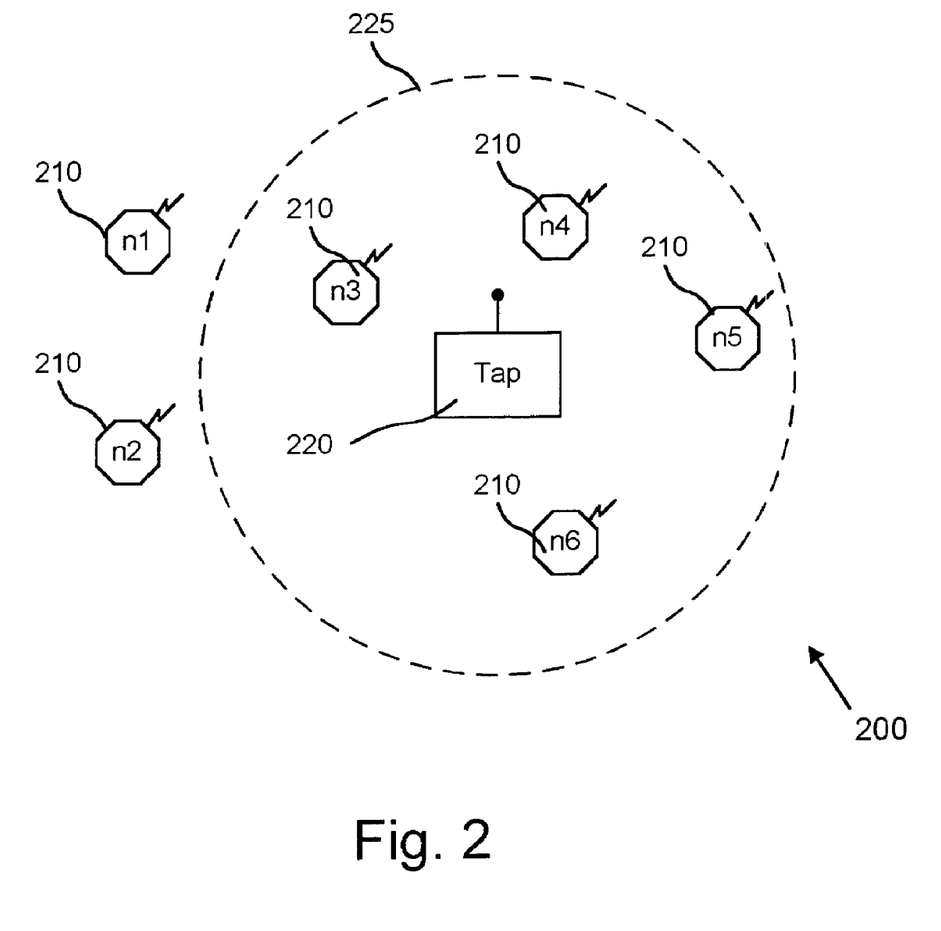
FIG. 2 is a diagram illustrating an exemplary wireless network and tap according to an implementation consistent with the present invention.

FIG. 2 is a diagram illustrating an exemplary wireless network 200 according to an implementation consistent with the present invention. The wireless network 200 may include a number of wireless nodes 210 and one or more wireless taps 220. The wireless nodes 210 may communicate via wireless transmission, either point-to-point or, more typically, broadcast transmission. The wireless tap 220 may have an associated area 225 in which it may be able to intercept wireless transmissions.

Although six nodes 210 and one tap 220 are shown in FIG. 2, this is purely exemplary. Wireless network 200 may include any number and configuration of nodes 210 and taps 220. The behavior and operation of the wireless nodes 210 and the wireless tap 220, where similar to the network nodes 110 and tap 120 described above, will not be repeated.

Wireless nodes 210 may communicate via chunks of data that are transmitted by senders 210. Senders 210 may transmit using various types of wireless physical layers, such as terrestrial RF, satellite bands, and free space optical.

Nodes n1–n6 may be, for example, radio routers or client radios in the wireless network 200.

Wireless tap 220 is a device that may intercept wireless transmissions on the network 200. Unlike tap 120, which may detect chunks of data only on a certain link 115, wireless tap 220 may observe some (potentially very large) fraction of the wireless spectrum, and thus may see transmissions from a wide range of senders 220. As shown in FIG. 2, tap 220 may have a limited effective reception range. Dashed line 225 indicates an effective reception area through which tap 220 may receive communications from the nodes. As shown, nodes n1 and n2 are out of the effective reception area and will not be monitored by tap 220. Nodes n3–n6, which are within the range 225, may be monitored by tap 220. The tap 220 may include, for example, a transceiver for sensing the chunks of data and may also include other circuitry (e.g., clock circuitry) for determining times of arrival and duration of the chunks. The tap 220 may include a processor for computing any other information (e.g., the sending or receiving node) associated with the chunks, such as information contained within physical characteristics of the chunk of data.

Wireless tap 220 also may record information about all the chunks that it observes in a tracefile. The tracefile may contain a minimum amount of information for each observed chunk. For example, the information may include the time the chunk was seen and the identity of the sender 210 of the chunk. The identity of the sender 210 may include, for example, an RF signature, the location of a radio transmitter 210, or "the same sender 210 as the one that also sent these other chunks." If available, the tracefile may also include additional information about the length or duration of the chunk, the destination node 210, or any insight into the contents of the chunk. Other information that may be available is the geographic location of the tap 220, as determined by, for example, a global positioning system (GPS) receiver.

Tap 220 may not capture all traffic within its range 225. For example, reception on the wireless network 200 may be variable due to environment, noise, transmission power, or jamming such that a tap is unable to observe some transmissions. Furthermore, tap 220 may occasionally make an error and mistakenly believe it has seen a chunk when no chunk was sent (again due to noise on a wireless network). If transmissions are missed, false transmissions are detected, or if a sender 210 is misclassified, these events may be viewed as adding noise to the signals generated by the tap 220. Other sources of noise in the signal generated by the tap 220 may include interference from other signals (e.g., packets belonging to another flow, or jitter in timing due to sharing of a bottleneck among multiple flows).

Tap 220 may listen passively and may not participate in the monitored network 200 at the MAC (or higher) layers. In some cases, for example with 802.11b LANs, it is possible for the tap 220 to snoop at the MAC layer and extract some information about higher layer protocols. In the case of tactical ad hoc networks, however, little or no information may be available about the MAC or higher layer protocols.

Although a single tap 220 is shown in FIG. 2, wireless network 200 may contain many taps 220, which may be interconnected. In general, the number of taps 220 placed in network 200 is determined by the desired coverage level of network 200. Taps 220 may work independently using purely local information. Distributed algorithms may allow sharing of information among taps 220. In such a case, taps 220 may have a globally synchronized clock that allows information from multiple taps 220 to be combined. A clock resolution of the taps 220 may be finer than the data sampling resolution of the taps 220, so that information about transmissions (e.g., the start time, duration, inter-transmission gap, and even the presence of short transmissions) is not missed.

In the presence of mobile nodes 210 (for example, in ad hoc wireless networks or Mobile IP), taps 220 may, but need not, be mobile. Taps 220 may be placed randomly over a specified geographic area, or in a pattern. Senders 210 can move into or out of range of one or more taps 220. Senders 210 typically may dwell in the range of one or more taps 220 long enough for transmissions to be observed, and the sources identified and recorded. Taps 220 may assign a unique identifier to each sender 210, for example, based on their RF signature. Taps 220 in the network 200 may assign the same unique identifier to any given sender 210.

Exemplary System-Level Processing

Figure 3:
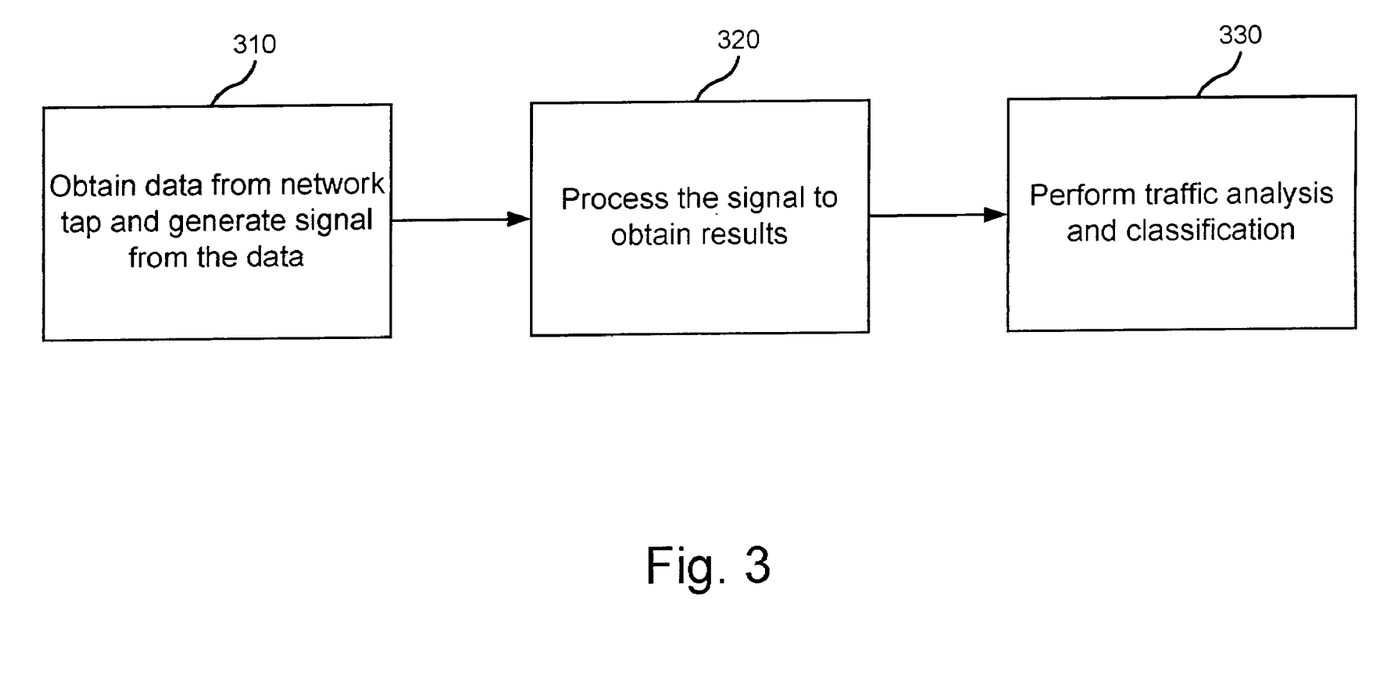
FIG. 3 is an exemplary diagram of traffic flow analysis and classification processing in the networks of FIGS. 1 and 2.

FIG. 3 is an exemplary diagram of traffic flow analysis and classification processing in networks 100 and 200. Processing may begin with a tap 120/220 obtaining data from its respective network 100/200. The tap 120/220 may also generate a signal from the data that it obtains [act 310].

Either the tap 120/220 or an associated (possibly central) processor (not shown) may perform processing on the signal produced by the tap 120/220 to produce results [act 320]. Such signal processing may produce identifiable signal traffic features, and may be computationally intensive. Those skilled in the art will appreciate, based on processing and networking requirements, whether to perform the signal processing at each tap 120/220 or other location(s).

The signal processing results may be further processed to analyze and classify the traffic on the network 100/200 [act 330]. Again, such traffic analysis processing may be performed by the tap 120/220 or another processor. Acts 310–330 may be broadly characterized as "signal generation," "signal processing," and "traffic analysis," respectively. These acts will be described in greater detail for certain implementations below.

Exemplary Signal Generation

Once a tap 120/220 has generated a tracefile of tapped data, a signal may be generated (e.g., as in act 310) from the tracefile for further traffic analysis. A tracefile may represent discrete events, namely a sequence of events associated with different times. The tracefile may include other information (e.g., sender or recipient information) associated with the events.

A general approach to producing a signal representing time of arrival of chunks is to pick an appropriate time quantization, to bin time into increments at that quantization, and to place a marker in the bins where a chunk was detected. At least three schemes may be used to represent the time of arrival of a chunk: 1) non-uniform time sampling, 2) uniform impulse sampling, and 3) uniform pulse sampling.

Figure 4A:
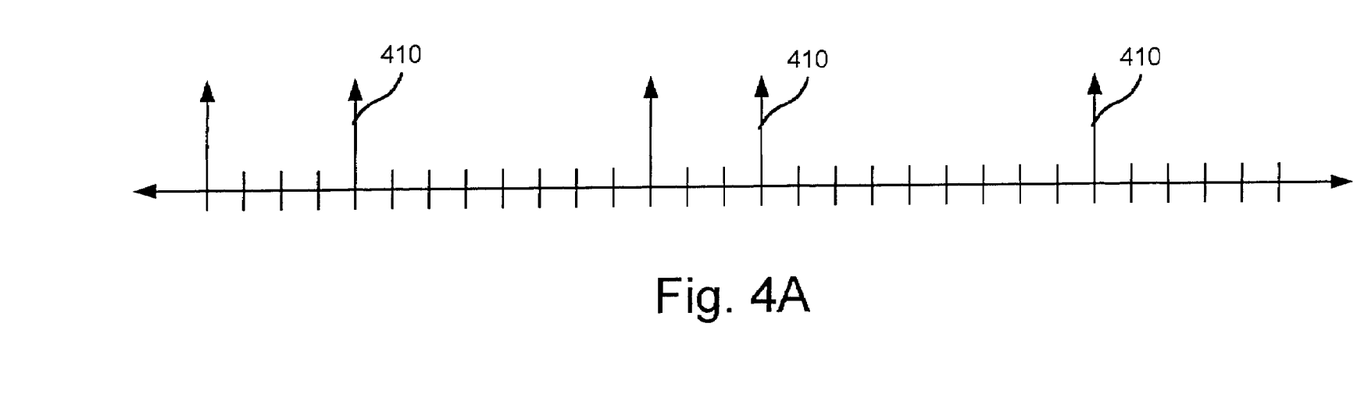
FIGS. 4A and 4B are exemplary signals that may be generated from tracefiles according to an implementation consistent with the present invention.

Under the first of the three schemes, a non-uniform signal may be represented as a non-uniformly-spaced sequence of impulses (e.g., FIG. 4A without a requirement that impulses 410 be spaced at the uniformly spaced marks as shown). Each impulse may indicate the leading edge of the discrete events in the tap's tracefile, where time is quantized to the desired resolution. Only a limited number of signal processing algorithms, however, have been derived for non-uniform sampled data. One example of such a signal processing algorithm is a Lomb Periodogram, which can process non-uniformly sampled data sets.

FIG. 4A illustrates the second scheme, which represents tracefile data as a uniformly sampled series of impulses 410. Such uniform sampling of the data implies a sample time quantization period (shown as tick marks in FIG. 4A). It is known that for accurate signal reconstruction, the data should be sampled such that the sampling frequency is greater than twice the highest frequency content of the data (i.e., the NyQuest rate). The tracefiles, however, contain discrete events (e.g., a chunk was seen at a particular time). So for most forms of processing, the discrete events of the tracefile are quantized into a time sequence of either impulses (e.g., FIG. 4A) or pulses (e.g., FIG. 4B).

Data may be encoded in each time increment as if it is a binary encoding: 1 (i.e., impulse 410) if a chunk is detected and 0 if not. More complex information, however, may be encoded in a time increment if such additional information is present in the tracefile. For example, if the duration of each chunk is known, then all the time increments during which a chunk was present may be set to 1, with 0's only during times when no chunks were visible. Such duration encoding would result in, for example, trains of adjacent impulses 410 (not shown).

Further, multiple chunks may be in transit at the same time. One approach to keep simultaneous data from being obscured may be to jitter the time of the conflicting events into empty adjacent sample times. Another approach to this issue may be to generate distinct tracefiles for each sender. Multiple tracefiles may refine later traffic flow analysis, by focusing on traffic from each sender separately. In another approach, rather than creating different encodings for different sources, the presence of multiple chunks may be encoded by placing a count of the number of live chunks in each increment. So there may be three chunks in one increment, five in the next, and so forth, where the number of chunks is encoded as the strength of the impulse 410.

Figure 4B:
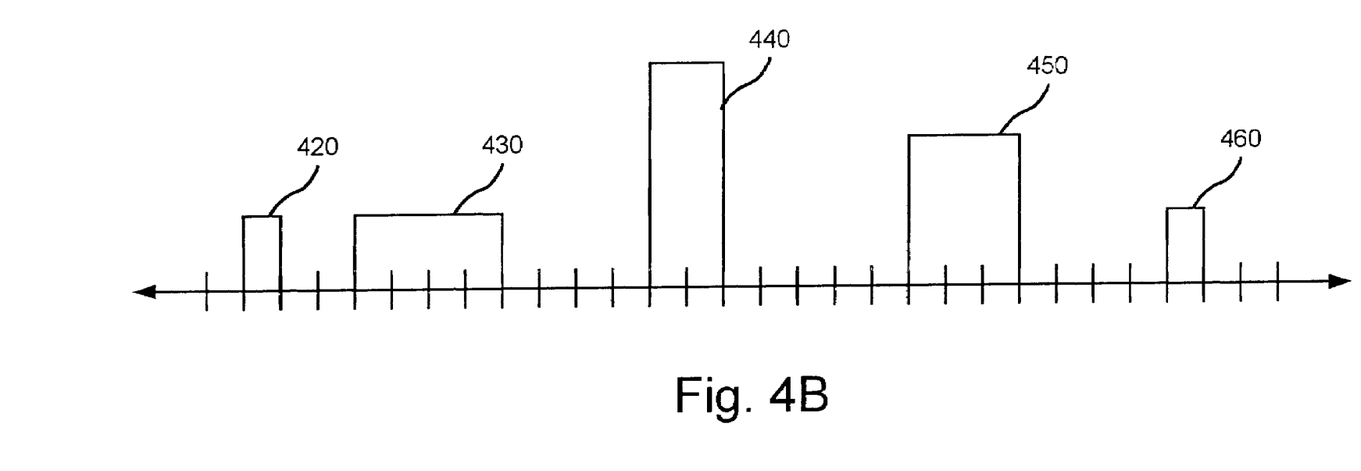

FIG. 4B illustrates the third scheme, which represents tracefile data as a uniformly sampled series of pulses 420–460. If information about the duration of chunks is not present in the tracefile (or will not be encoded), the arrival of chunks may be encoded by a pulse of unit height and length (e.g., pulses 420 and 460). If the duration of each chunk is available, the time increments during which a chunk was present may be set to 1, with 0's only during times when no chunks were visible (e.g., pulses 430–450 and the spaces among them).

Similarly, if multiple chunks are in transit at the same time, the associated signal may be encoded as a series of weighted pulses whose pulse height encodes the number of chunks (e.g., pulses 440 and 450). Thus, pulses 420–460 may encode three pieces of information present in the tracefile: the start time of a chunk, the duration of the chunk, and how many chunks are present at a particular time.

Further, the pulses 420–460 need not be rectangular as shown in FIG. 4B. Pulses may be, for example, Gaussian pulses whose width and/or height may be proportional to as many as two different pieces of information.

Other encoding schemes will be apparent to those skilled in the art, depending on the amount of available information in the tracefiles and the ability of later signal processing schemes to use the available information. Exemplary schemes may include binary, single value encoding (e.g., amplitude proportional to value), multiple value encoding, pulse length encoding, and complex amplitude encoding, or combinations thereof. The above methods of generating signals from data collected by taps 120/220 are exemplary, and should not limit other methods of generating signals which may be implemented by those skilled in the art without undue experimentation.

Exemplary Cepstrum Signal Processing

Given an encoded signal (e.g., that shown in FIG. 4A or 4B), signal processing algorithms may be used to extract traffic information (e.g., as in act 320). Signal processing may reveal valuable information about the network 100/200 from traces containing minimum information (e.g., the times of arrivals of the chunks). Because such an approach does not require any information about the actual contents of the chunks themselves, such signal processing can work even with encrypted data transfers, if chunk arrivals can be sensed. An approach is to examine encoded trace signals (e.g., FIG. 4A or 4B) and identify the prominent frequencies or time periods in those signals.

Periodograms, or Power Spectral Density (PSD) estimators, are spectral analysis techniques that may be used to compute (and plot) the signal power (or spectral density) at various frequencies. A periodogram may be used to identify those frequencies which have power above a certain predetermined threshold. Thus, periodograms are useful for identifying important frequencies, even in the absence of any prior knowledge about the nature of the signal. Another important characteristic of periodogram techniques is that they work very well even in the presence of noise. Such performance in the face of noise may be useful in flow analysis, because typically chunk or packet transmissions are present that are unrelated to the flow or conversation under investigation.

Most periodogram techniques use the standard Discrete Fourier Transform (DFT) to compute the spectral power densities. When signals are expected to be noisy (i.e., have a high degree of randomness associated with them due to corruption by noise, or consisting of random processes themselves), DFT processing may not provide a good unbiased estimate of the signal power spectrum. Another estimate of the signal PSD in such cases may be obtained with a Welch Averaged Periodogram (WAP), which uses averaging to reduce the influence of noise. In the WAP, a windowing function may be used to reduce the effects of segmenting the data and to reduce artifacts caused by the abrupt changes at the endpoints of the window. The result may be considered a decomposition of the random signal into a set of discrete sinusoids and an estimation of the average contribution (power) of each one.

Peaks in the resultant periodogram may correspond to frequencies of times of arrival. The power of these peaks are proportional to the product of how often the arrival pattern occurs and the data scaling of the signal.

The above techniques perform best when the underlying random process (e.g., signal traffic) that generated the signal is wide-sense stationary. These periodogram techniques are still valuable, however, when the signal statistics vary slowly enough that they are nominally constant over a long enough observation time to generate good estimates.

A signal may be divided up into sections of a certain duration (e.g., 0.5 seconds), and a periodogram may be computed for each segment. Optionally, the sections may be overlapped by a fixed percentage amount. The output periodogram of each time section may be assembled as columns of a two-dimensional matrix to form an image with time along the horizontal axis and the arrival frequency along the other. Such a two-dimensional representation may be referred to as a "spectrogram." An exemplary spectrogram will be described below with regard to FIG. 7.

Sometimes spectra in general, and spectrograms in particular, are so complex that key features cannot be visually identified. One technique for identifying periodic components of signals is known as the "Cepstrum." A Cepstrum C(k) may identify periodic components in a uniformly sampled signal x(n) by looking for harmonically related peaks in the signal spectrum. The Cepstrum does this by performing an Discrete Fourier Transform (DFT), or its inverse, on the log-magnitude of the spectrum X(k) of the signal x(n):

$$C(k)=|DFT\{\log |X(k)|\}| \quad \text{(Equation 1)}$$

In an alternate implementation, the power spectral density P(k) (e.g., as computed by a Welch averaged periodogram) may be used in place of the spectrum X(k). In this case, the result of this processing may be referred to as a "Cepstrogram." When cepstrogram data is generated in a two-dimensional format like a spectrogram, the above techniques may be applied to the time axis of the spectrogram to identify longer-term features.

Figure 5:
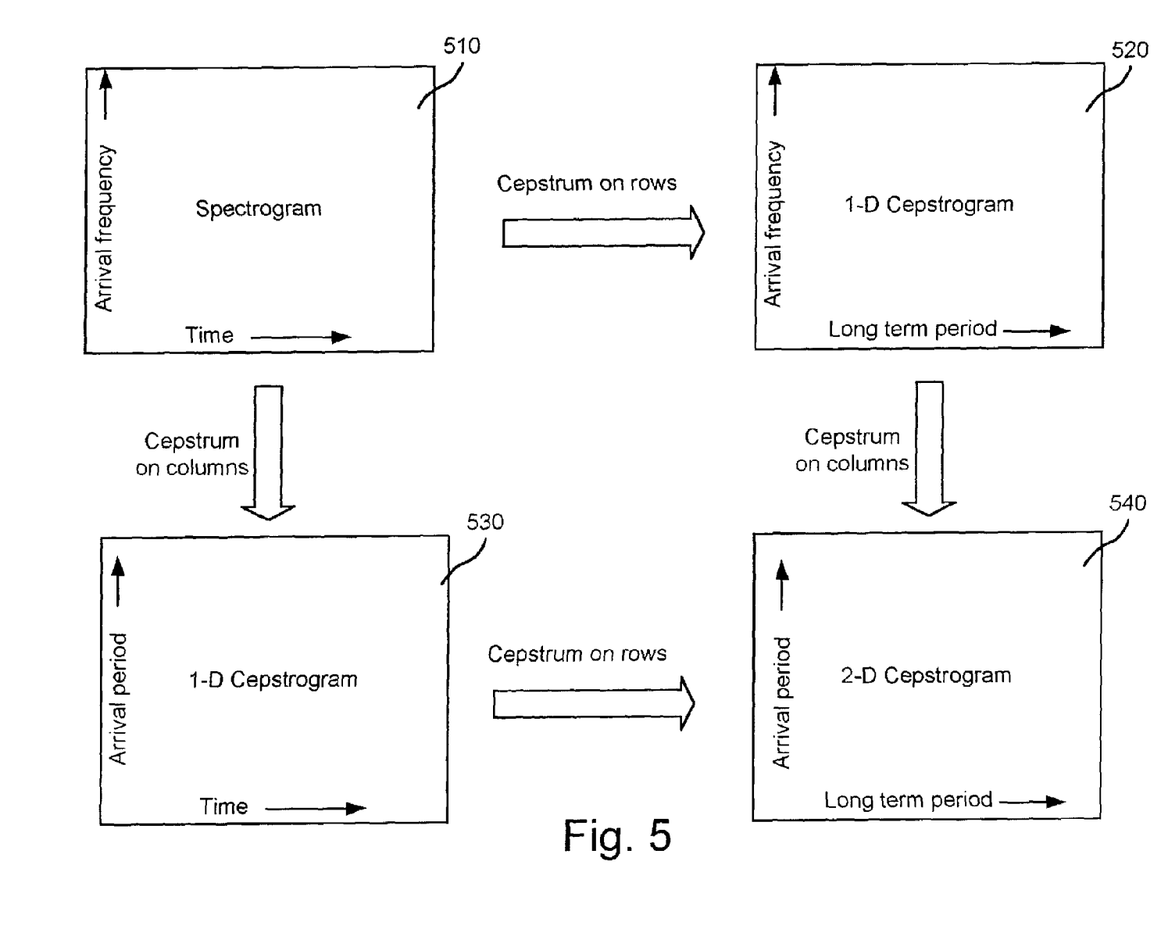
FIG. 5 illustrates one-dimensional and two-dimensional Cepstrum processing according to principles of the invention.

FIG. 5 illustrates Cepstrum processing in accordance with principles of the invention. Processing may begin by generating a spectrogram 510 from a signal obtained from a tap. The spectrogram 510 may contain frequencies of arrival for discrete amounts of time (i.e., plotted on the y-axis), and these frequencies may be plotted over some period of observation (i.e., the x-axis, which may extend over, for example, several seconds).

Processing may continue by performing cepstrum transforms on the rows of spectrogram 510 to generate a one-dimensional ("1-D") cepstrogram 520. The 1-D cepstrogram 520 may contain frequencies of arrival (i.e., plotted on the y-axis), and these frequencies may be plotted against long-term periods (i.e., the x-axis, which may show periods of, for example, zero to several seconds). 1-D cepstrogram 520 may illustrate the "long-term" periodicity of the signal used to generate the spectrogram 510.

Processing may continue by performing cepstrum transforms on the columns of spectrogram 510 to generate a one-dimensional ("1-D") cepstrogram 530. The 1-D cepstrogram 530 may contain time of arrival periods (i.e., plotted on the y-axis), and these periods may be plotted over some period of observation (i.e., the x-axis, which may extend over, for example, several seconds). 1-D cepstrogram 530 may illustrate the "short-term" periodicity of the signal used to generate the spectrogram 510.

Processing may continue by performing cepstrum transforms on either the columns of 1-D cepstrogram 520 and/or the rows of 1-D cepstrogram 530 to generate a two-dimensional ("2-D") cepstrogram 540. The 2-D cepstrogram 540 may contain time of arrival periods (i.e., plotted on the y-axis), and these periods may be plotted against long-term periods (i.e., the x-axis, which may show periods of, for example, zero to several seconds). 2-D cepstrogram 540 may illustrate the confluence of short-term periodicity and long-term periodicity in the signal used to generate the spectrogram 510. In other words, 2-D cepstrogram may illustrate events which have a short duration (e.g., a signal handshake) that occur periodically over a relatively long time. Data in 2-D cepstrogram 540 may be thresholded to produce a combined short and long-term periodic "signature" of the signal from the tap 120/220 that produced spectrogram 510.

As used herein, "short-term" and "long-term" are intended as indicators of degree, and not as limiting absolutes. While "long-term" periodicity may reflect periods that are an order of magnitude (or more) larger than the "short-term" periods, this difference in magnitude need not always be the case. "Long-term" periods may be, for example, two to several times longer than "short-term" periods.

Exemplary Simulation Results

For illustrative purposes, a wired network was simulated, and the processing described in FIG. 5 was performed on a signal generated from the simulated network. The simulated wired network had the topology of nodes 110 (in particular nodes n1–n4) in FIG. 1. Two data flows were present in the simulated network. The first data flow was an FTP/TCP from node n1 to node n4 by way of node n3. The second data flow was an FTP/TCP from node n2 to node n4, also by way of node n3. The link between nodes n3 and n4 is the bottleneck link on this simulated network. The tap only sees packets going from n3 to n4 or vice versa. Times of arrival may be encoded using an amplitude of +1 for traffic traveling from node n3 and an amplitude of −1 for traffic traveling from node n4. In one implementation, traffic traveling from node n4 may be discarded after encoding, or not encoded.

The simulation was run in a network simulator for 300 seconds. For the first FTP flow, 27,451 packets went from node n1 to n4, and 27,432 ACKs went from node n4 back to n1, resulting in an average transmission interval of 10.93 ms. The estimated round trip time (rtt) was 218.67 ms for the first FTP flow. For the second FTP flow, 28,829 packets went from node n2 to n4, and 28,809 ACKs went from node n4 back to n2, resulting in an average interval of 10.41 ms. The rtt estimate was 208 ms for the second FTP flow. Although FIG. 1 illustrates a wired network 100, the following simulation results are equally exemplary of a wireless network (e.g., 200), where, for example, the tap may be placed so that it only receives data transmitted between two nodes, and not others.

Figure 6:
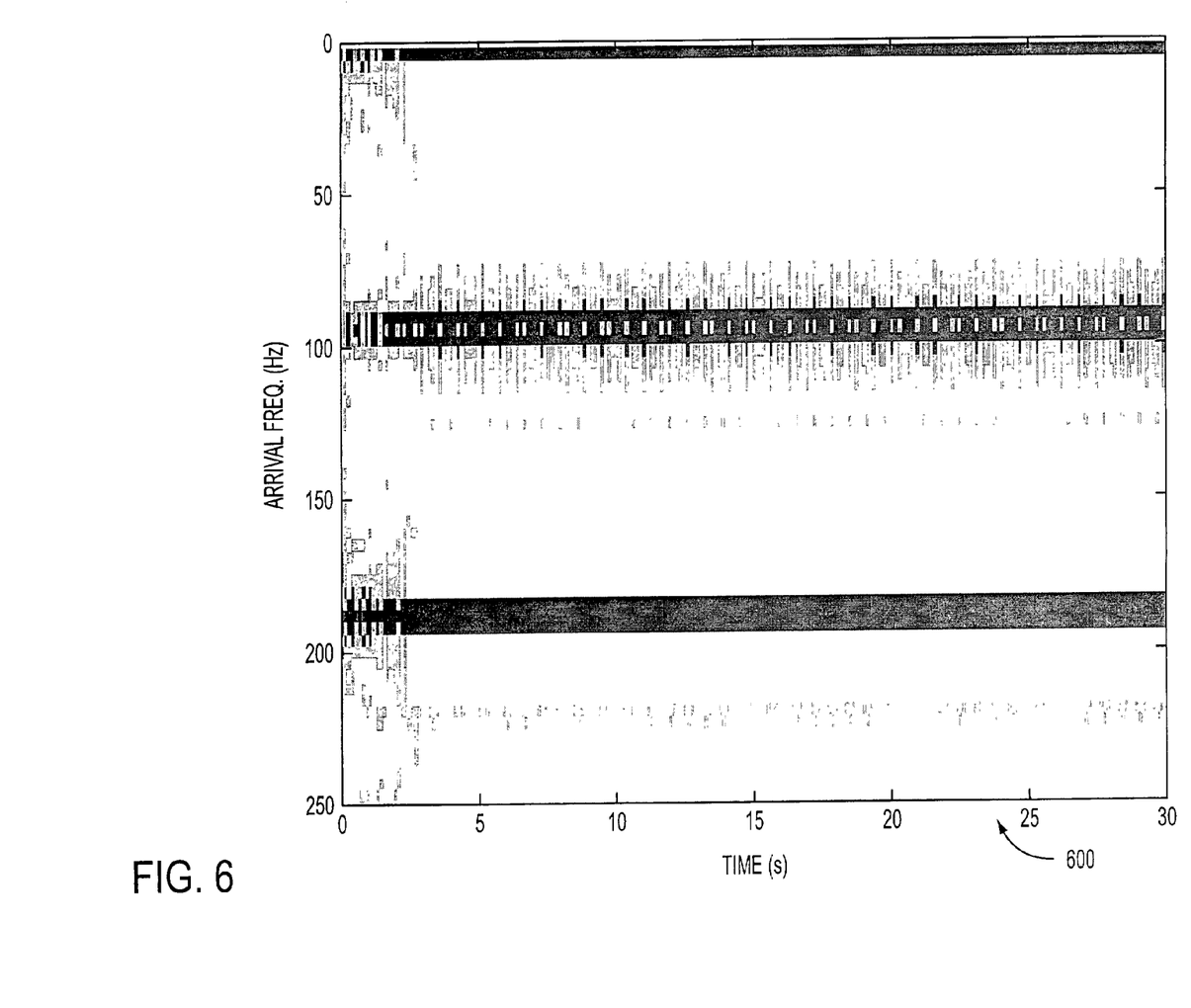
FIG. 6 is an exemplary spectrogram generated from a signal obtained from a simulated network.

FIG. 6 shows a time-frequency spectrogram 600 that was created from the signal generated from data intercepted between simulated nodes n3 and n4. The signal was sampled with a period of 0.5 msec, divided into 0.512 second sections, and processed with a 1024 point FFT. The resulting spectrum of each 0.512 second section is plotted in a vertical column with intensity proportional to spectral bin level (i.e., darker corresponds to a higher bin level).

The resulting spectrogram 600 has a y-axis of frequency and an x-axis of time. Spectrogram 600 may be viewed as a specific example of spectrogram 510 in FIG. 5. Consistently present frequencies show up as dark horizontal lines. The four prominent frequencies may be seen to be at approximately 4, 90, 98 and 187 Hz, corresponding to key timing parameters of both the first and second data flows. The 4 Hz frequency corresponds to a period of about 250 ms, which is close to the round-trip times of the two FTP flows of 218.67 ms and 208 ms. The 90 Hz frequency corresponds to a period of about 11 ms, which is close to the average transmission interval of 10.93 ms for the first FTP transmissions from node n1 to node n4. The 98 Hz frequency corresponds to a period of about 10.1 ms, which is close to the average transmission interval of 10.41 ms for the second FTP transmissions from node n2 to node n4. The 187 Hz frequency corresponds to a period of about 5.3 ms, which is close to the average packet interarrival time of 5.33 ms on the bottleneck link between nodes n3 and n4.

Because FIG. 6 is a two-dimensional representation of the time varying spectra, it is able to illustrate short-term flow (and TCP) dynamics. As may be seen, the flows do not stabilize until about 2.5 s. A reason this instability is that, during the first 2.5 seconds, TCP is in a "slow-start" phase. After that point, the round trip times (which correspond to the 4 Hz line) and the utilization on the bottleneck link (indicated by the interarrival line at 187 Hz) stabilize and remain relatively constant until the end of simulation. The send rates of the two FTP flows, however, continue to oscillate around the mean frequencies of 90 Hz and 98 Hz, in the range between 75 Hz and 120 Hz (i.e., 13.3 ms and 8.3 ms transmission intervals), even after the first 2.5 seconds. This oscillation may be attributed to TCP's congestion avoidance mechanism, which results in a variation in the rate at which data is sent from the end-host (e.g., node n1).

Because of the granularity of the windows, the frequency bins, and resampling, the frequencies listed above are approximate. The accuracy of such observations may be improved by reducing the size of the frequency bins and increasing the sampling frequency. It should be noted, however, that this analysis is able to reveal key timings for both the first and second data flows, even though the signal only encodes the transmissions from node 3 going to node 4.

Figure 7:
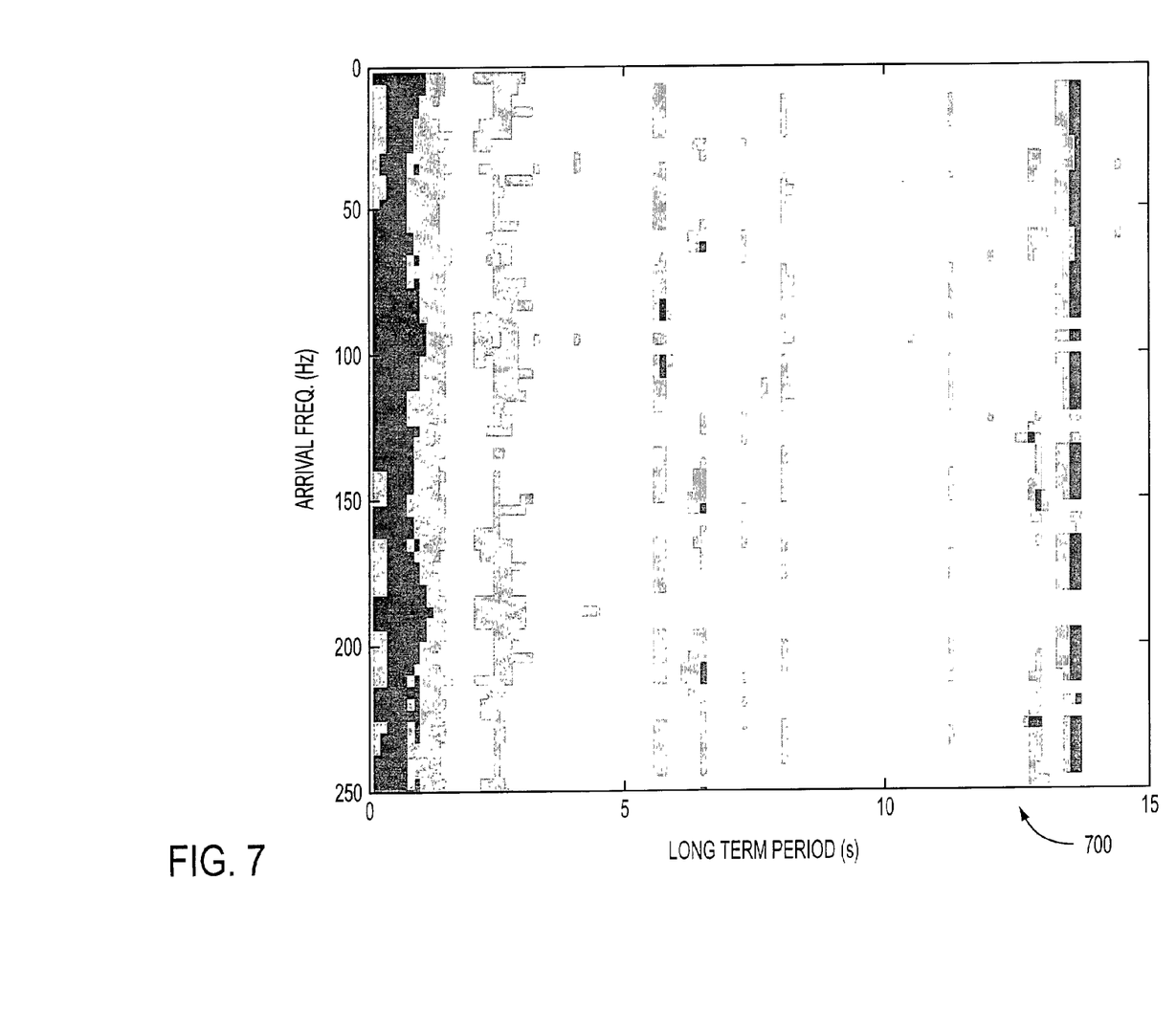
FIG. 7 is an exemplary cepstrogram generated from the spectrogram in FIG. 6.

FIG. 7 shows a 1-D cepstrogram 700 that was created from the spectrogram 600 by performing one-dimensional cepstra on the rows of the spectrogram 600. Cepstrogram 700 may be viewed as a specific example of cepstrogram 520 in FIG. 5. As may be seen in FIG. 7, long-term periodic behavior occurs at almost all frequencies. Such long-term periodic behavior appears to be strongest at periods of about 5.6 seconds, 6.4 seconds, 12.8 seconds, and 13.5 seconds. There is also a jumble at all frequencies in the slow-start phase until 2.5 seconds.

Figure 8:
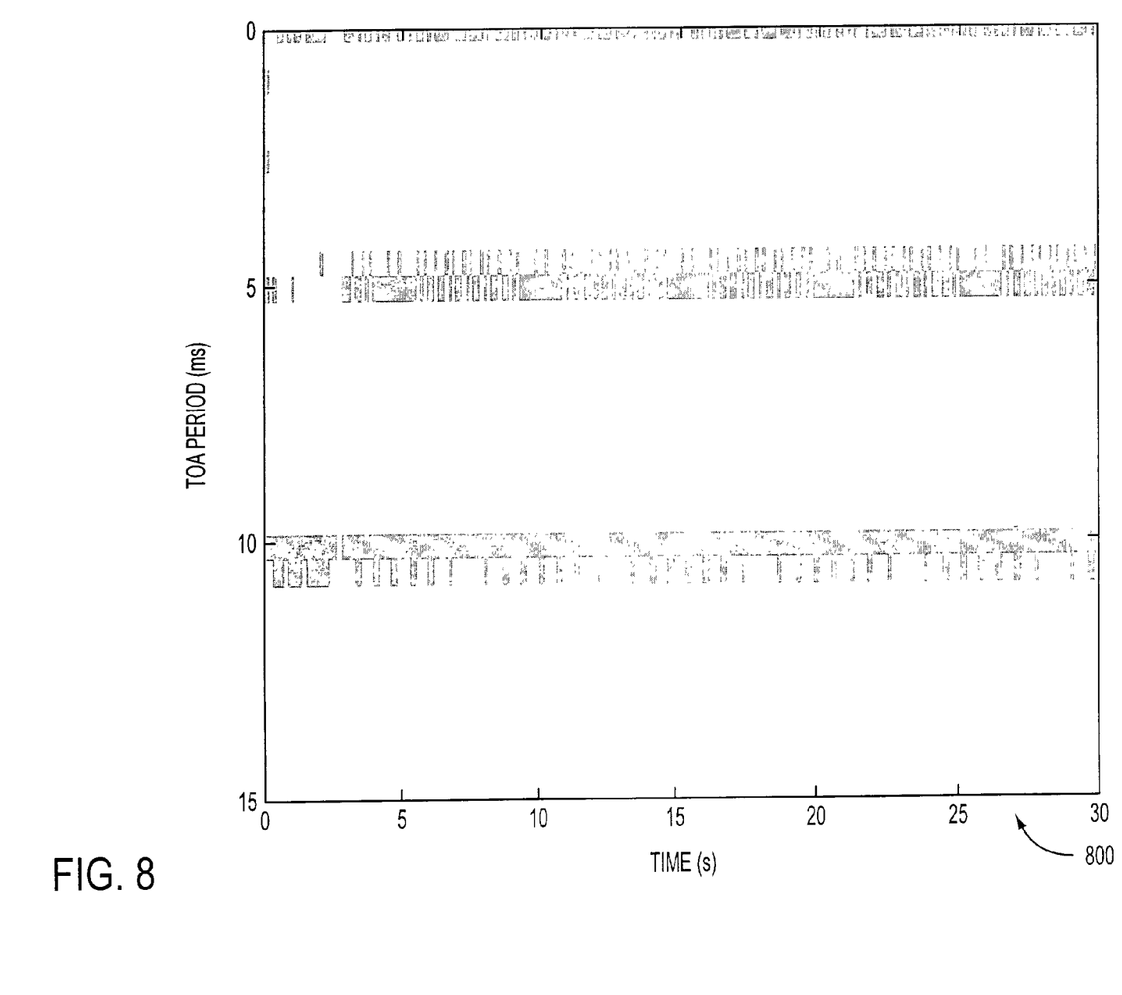
FIG. 8 is another exemplary cepstrogram generated from the spectrogram in FIG. 6.

FIG. 8 shows a 1-D cepstrogram 800 that was created from the spectrogram 600 by performing one-dimensional cepstra on the columns of the spectrogram 600. Cepstrogram 800 may be viewed as a specific example of cepstrogram 530 in FIG. 5. FIG. 8 shows short-term periodic behavior of the signal as a function of time. The strongest periods (i.e., the darker portions) appear to alternate in a long-term periodic pattern.

Figure 9:
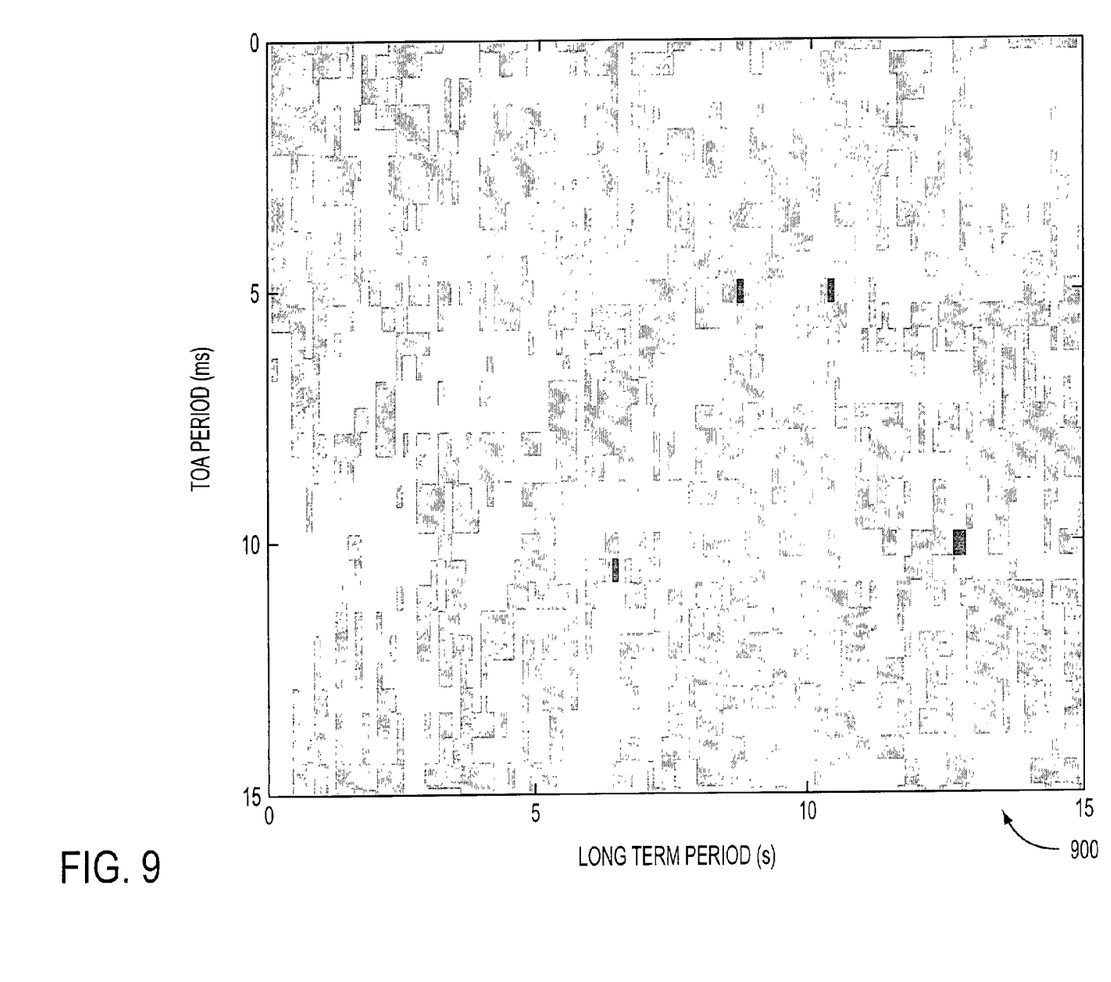
FIG. 9 is an exemplary two-dimensional cepstrogram generated from the cepstrogram in FIG. 7 or 8.

FIG. 9 shows a thresholded, 2-D cepstrogram 900 that was created from the spectrogram 600 by performing respective cepstra on the rows and on the columns of the spectrogram 600. Cepstrogram 900 may be viewed as a specific example of cepstrogram 540 in FIG. 5. The resulting short-period versus long-period data may have highly localized peaks. These peaks in cepstrogram 900 may correspond to short-term periodic transmissions that themselves appear and disappear at longer time intervals. FIG. 9 shows the location of the four highest peaks in the period space: two peaks at 8.7 and 10.4 seconds, corresponding to the bottleneck interarrival of 5.3 ms; one peak at 12.7 seconds corresponding to the send rate of the second FTP flow (i.e., 10.1 ms); and one at 6.4 seconds, corresponding to the send rate of the first FTP flow (i.e., 11 ms). The four peaks may constitute a pattern in the short/long-term periodic space illustrated in FIG. 9. Such a pattern of peaks may be used as a "signature" of the tapped data for flow classification purposes.

Exemplary Flow Classification Processing

Classification of signatures (e.g., as in act 330) is generally understood by those skilled in the signal processing arts. Various techniques are known to classify a certain signature into one or more different classes. Generally, these techniques involve training or otherwise developing a number of known signatures, against which a candidate signature will be compared. Candidate signatures (e.g., that shown in FIG. 9) may be compared against a set of known signatures, and probabilities or other measures of "sameness" with various known signatures may be generated. Alternately, binary decisions may be made (i.e., matches or does not) based on a boundary between different signatures in a particular signature-space.

Using a short/long-term signature generated from a 2-D cepstrogram (e.g., 540), a signal generated from a tap 120/220 may be classified into one or more types of known data flows (e.g., FTP session, chat session, voice over IP, etc.). Hence, using a minimal amount of information, such as the arrival times of chunks at a tap 120/220, different flows at the tap 120/220 may be detected and classified.

CONCLUSION

Methods and systems consistent with the principles of the invention may use short-term and long-term periodicity information in intercepted communication data to generate a signature associated with the data. Cepstrum processing may be used to generate the signature. This signature may be used to classify the type of communication that contained the data.

The foregoing description of preferred embodiments of the invention provides illustration and description, but is not intended to be exhaustive or to limit the invention to the precise form disclosed. Modifications and variations will be apparent to those skilled in the art in light of the above teachings or may be acquired from practice of the invention.

For example, the processing shown in FIGS. 4 and 5 may be performed by a computer program or software instructions executed on a general-purpose processor (not shown). Where expeditious, some instructions may be performed in parallel on multiple processors (e.g., computing different periodograms). The computer program or software instructions may be embodied on a computer-readable medium (e.g., magnetic, optical, semiconductor, etc.) that is readable by a general-purpose processor.

Further, although cepstrum processing has been discussed as one way to obtain both short-term and long-term periodicity information about a signal, other types of signal processing may be used that generate such dual periodicity information. It is specifically contemplated that these other schemes for generating a diagram of short-term verses long-term periodicity may be utilized according to the principles of the invention described herein.

Moreover, the acts in FIG. 4 need not be implemented in the order shown; nor do all of the acts need to be performed. Also, those acts which are not dependent on other acts may be performed in parallel with the other acts.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method of analyzing communication in a network, comprising:

obtaining time of arrival information for chunks of data in the network;

constructing a signal to represent the time of arrival information;
processing the signal to obtain periodicity information about both short-term periodicity and long-term periodicity of the signal, wherein the processing includes:
generating a spectrogram that plots arrival frequency of the chunks of data against time from the signal, and
constructing a cepstrogram that contrasts short-term arrival periods of data chunks against long-term periods from the spectrogram, wherein the constructing a cepstrogram includes performing cepstrum processing on both rows and columns of the spectrogram;
generating a signature associated with the chunks of data from the short-term and long-term periodicity of the signal; and
classifying a type of the communication associated with the chunks of data using the signature,
wherein the short-term and long-term periodicity of the signal is used to generate the signature associated with the chunks of data, even when the data is encrypted.

2. The method of claim 1, wherein the time of arrival information includes at least one of a node on the network that transmitted the chunk of data, a duration of the chunk of data, and a node on the network that will receive the chunk of data.

3. The method of claim 1, wherein the network is a wireless network.

4. The method of claim 1, wherein the network is a wired network.

5. The method of claim 1, wherein the constructing includes:
encoding times of arrival as impulses or pulses using uniform sampling of the time of arrival information.

6. The method of claim 1, wherein the generating includes:
computing a plurality of periodograms from the signal, each periodogram corresponding to a discrete time period within the signal.

7. The method of claim 1, wherein the periodicity information contrasts the short-term periodicity and the long-term periodicity of the signal.

8. The method of claim 1, further comprising:
classifying a communication associated with the chunks of data using the periodicity information.

9. A method of processing a communication signal, comprising:
computing a plurality of periodograms from the signal that represents time of arrival information for data in a network, each of the periodograms being generated from a portion of the signal;
combining the plurality of periodograms in time sequence to form a spectrogram containing the periodograms;
generating a cepstrogram by performing cepstrum processing on the spectrogram, wherein the generating a cepstrogram includes:
performing cepstrum processing on at least one of rows of the spectrogram and columns of the spectrogram, wherein the performing cepstrum processing includes:
performing cepstrum processing on the rows of the spectrogram to obtain a cepstrogram that reflects short-term and long-term periodic behavior of the signal;
generating a signature based on short-term and long-term periodic behavior of the signal; and
classifying a type of communication that contained the data using the signature,
wherein the short-term and long-term behavior of the signal is used to generate the signature, even when the data is encrypted.

10. The method of claim 9, wherein the computing includes:
computing each of the periodograms using a Discrete Fourier Transform (DFT).

11. The method of claim 9, wherein the computing includes:
computing each of the periodograms using a Welch averaged periodogram procedure.

12. The method of claim 9, wherein the performing includes:
performing cepstrum processing on the rows of the spectrogram to obtain a cepstrogram that reflects long-term periodic behavior of the signal.

13. The method of claim 9, wherein the performing includes:
performing cepstrum processing on the columns of the spectrogram to obtain a cepstrogram that reflects short-term periodic behavior of the signal.

14. The method of claim 13, wherein the generating further includes:
performing cepstrum processing on the rows of the cepstrogram to obtain another cepstrogram that reflects short-term periodic behavior and long-term periodic behavior of the signal.

15. The method of claim 14, further comprising:
classifying a communication associated with the signal using the another cepstrogram.

16. A computer-readable storage medium that stores instructions executable by one or more processors to perform a method for processing a signal, comprising:
instructions for computing a plurality of periodograms from the signal that represents time of arrival information for data in a network, each of the periodograms being generated from a portion of the signal;
instructions for combining the plurality of periodograms to form a spectrogram;
instructions for generating a cepstrogram from the spectrogram,
wherein the instructions for generating a cepstrogram include:
instructions for performing cepstrum processing on at least one of rows of the spectrogram and columns of the spectrogram, wherein the instructions for performing cepstrum processing include:
instructions for performing cepstrum processing on both the rows of the spectrogram and the columns of the spectrogram to obtain the cepstrogram that reflects short-term and long-term periodic behavior of the signal;
instructions for generating a signature based on short-term and long-term periodic behavior of the signal; and
instructions for classifying a type of communication that contained the data using the signature,
wherein the short-term and long-term behavior of the signal is used to generate the signature, even when the data is encrypted.

17. The medium of claim 16, further comprising:
instructions for classifying a communication associated with the signal using the cepstrogram.

18. A communication tap in a network, comprising:
means for obtaining time of arrival information for chunks of data in the network;
means for constructing a signal from the time of arrival information; and means for processing the signal to obtain information relating short-term periodicity of the signal to long-term periodicity of the signal, wherein the means for processing includes:
  means for generating a spectrogram that plots arrival frequency of the chunks of data against time from the signal, and
  means for constructing a cepstrogram that contrasts short-term arrival periods of data chunks against long-term periods from the spectrogram, wherein means for the constructing a cepstrogram includes means for performing cepstrum processing on both rows and columns of the spectrogram;
means for generating a signature associated with the chunks of data from the short-term and long-term periodicity of the signal; and
means for classifying a type of communication associated with the chunks of data using the signature,
  wherein the short-term and long-term periodicity of the signal is used to generate the signature associated with the chunks of data, even when the data is encrypted.

19. The communication tap of claim 18, further comprising:
means for classifying a communication associated with the chunks of data according to the information relating short-term periodicity of the signal to long-term periodicity of the signal.

* * * * *